US011100507B2

(12) United States Patent
Salmon et al.

(10) Patent No.: US 11,100,507 B2
(45) Date of Patent: Aug. 24, 2021

(54) DATA PASSED IN AN INTERACTION

(71) Applicant: VISA INTERNATIONAL SERVICE ASSOCIATION, San Francisco, CA (US)

(72) Inventors: Diane Salmon, Lafayette, CA (US); Chandra Srivastava, San Jose, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 598 days.

(21) Appl. No.: 16/008,960

(22) Filed: Jun. 14, 2018

(65) Prior Publication Data
US 2018/0293585 A1 Oct. 11, 2018

Related U.S. Application Data

(63) Continuation of application No. 14/680,874, filed on Apr. 7, 2015, now Pat. No. 10,026,087.
(Continued)

(51) Int. Cl.
*G06Q 20/40* (2012.01)
*G06Q 20/12* (2012.01)
(Continued)

(52) U.S. Cl.
CPC ......... *G06Q 20/4016* (2013.01); *G06Q 20/12* (2013.01); *G06Q 20/322* (2013.01);
(Continued)

(58) Field of Classification Search
CPC ...... G06Q 20/401; G06Q 20/12; G06Q 20/32; G06Q 20/36
(Continued)

(56) References Cited

U.S. PATENT DOCUMENTS 5,613,012 A 3/1997 Hoffman et al.
5,781,438 A 7/1998 Lee et al.
(Continued)

FOREIGN PATENT DOCUMENTS

EP 2156397 2/2010
WO 0135304 5/2001
(Continued)

OTHER PUBLICATIONS

R. K. Balan and N. Ramasubbu, "The Digital Wallet: Opportunities and Prototypes," in Computer, vol. 42, No. 4, pp. 100-102, Apr. 2009, doi: 10.1109/MC.2009.134. (Year: 2009).*
(Continued)

*Primary Examiner* — Jessica Lemieux
(74) *Attorney, Agent, or Firm* — Kilpatrick Townsend & Stockton LLP

(57) ABSTRACT

A method for providing first data and second data for an interaction is disclosed. The first data is beneficial to a first party and necessary for the interaction, while the second data is beneficial to a second party and is not necessary for the interaction. The first data and second data are provided by a first party device in a single data element. A second party device receives the single data element, separates the first data and second data, and processes the first data and second data separately.

20 Claims, 8 Drawing Sheets

Related U.S. Application Data

(60) Provisional application No. 61/976,989, filed on Apr. 8, 2014.

(51) Int. Cl.
*G06Q 20/32* (2012.01)
*G06Q 20/36* (2012.01)

(52) U.S. Cl.
CPC ..... *G06Q 20/3224* (2013.01); *G06Q 20/3227* (2013.01); *G06Q 20/3274* (2013.01); *G06Q 20/36* (2013.01)

(58) Field of Classification Search
USPC .......................................................... 705/44
See application file for complete search history.

(56) References Cited

U.S. PATENT DOCUMENTS

| | | |
|---|---|---|
| 5,883,810 A | 3/1999 | Franklin et al. |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,227,447 B1 | 5/2001 | Campisano |
| 6,236,981 B1 | 5/2001 | Hill |
| 6,267,292 B1 | 7/2001 | Walker et al. |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,553 B1 | 4/2010 | Dickelman |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen et al. |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,171,525 B1 | 5/2012 | Pelly et al. |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren |
| 8,433,116 B2 | 4/2013 | Butler et al. |

(56) References Cited

U.S. PATENT DOCUMENTS

| | | |
|---|---|---|
| 8,442,894 B2 | 5/2013 | Blackhurst et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | McGuire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | Von Behren et al. |
| 8,651,374 B2 | 2/2014 | Brabson et al. |
| 8,656,180 B2 | 2/2014 | Shablygin et al. |
| 8,751,391 B2 | 6/2014 | Freund |
| 8,762,263 B2 | 6/2014 | Gauthier et al. |
| 8,762,283 B2 | 6/2014 | Gerber et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 10,026,087 B2 | 7/2018 | Salmon et al. |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0116341 A1 | 8/2002 | Hogan et al. |
| 2002/0128977 A1 | 9/2002 | Nambiar et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0030659 A1 | 2/2004 | Gueh |
| 2004/0044379 A1 | 3/2004 | Holsheimer |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0084913 A1 | 4/2007 | Weston |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0063345 A1 | 3/2009 | Erikson |
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |

(56) References Cited

U.S. PATENT DOCUMENTS

| | | |
|---|---|---|
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0153437 A1 | 6/2011 | Archer et al. |
| 2011/0153496 A1 | 6/2011 | Royyuru |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0191252 A1 | 8/2011 | Dai |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0130898 A1 | 5/2012 | Snyder et al. |
| 2012/0136780 A1 | 5/2012 | El-Awady et al. |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0244885 A1 | 9/2012 | Hefetz |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0310836 A1 | 12/2012 | Eden et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0030934 A1 | 1/2013 | Bakshi et al. |
| 2013/0031006 A1 | 1/2013 | McCullagh et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0073463 A1 | 3/2013 | Dimmick et al. |
| 2013/0081122 A1 | 3/2013 | Svigals et al. |
| 2013/0091028 A1 | 4/2013 | Oder, II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166450 A1 | 6/2013 | Pama |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1* | 9/2013 | Carlson ............... G06Q 20/405 705/16 |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | Von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |

(56) References Cited

U.S. PATENT DOCUMENTS

| | | |
|---|---|---|
| 2013/0262316 A1 | 10/2013 | Hruska |
| 2013/0262317 A1 | 10/2013 | Collinge et al. |
| 2013/0268776 A1 | 10/2013 | Motoyama |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317886 A1* | 11/2013 | Kiran .............. G06Q 30/0202 705/7.31 |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0074724 A1 | 3/2014 | Gordon et al. |
| 2014/0095331 A1* | 4/2014 | Wong .............. G06Q 20/322 705/17 |
| 2014/0108172 A1 | 4/2014 | Weber et al. |
| 2014/0108265 A1 | 4/2014 | Hayhow et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178721 A1* | 6/2015 | Pandiarajan ..... G06K 19/06037 705/75 |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0287037 A1 | 10/2015 | Salmon et al. |
| 2015/0312038 A1 | 10/2015 | Palanisamy |
| 2015/0319158 A1 | 11/2015 | Kumnick |
| 2015/0319161 A1 | 11/2015 | Dimmick |
| 2015/0332262 A1 | 11/2015 | Lingappa |
| 2015/0339664 A1 | 11/2015 | Wong et al. |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0224976 A1 | 8/2016 | Basu et al. |
| 2017/0046696 A1 | 2/2017 | Powell et al. |
| 2017/0103387 A1 | 4/2017 | Weber |
| 2017/0220818 A1 | 8/2017 | Nagasundaram et al. |
| 2017/0228723 A1 | 8/2017 | Taylor et al. |

FOREIGN PATENT DOCUMENTS

| | | |
|---|---|---|
| WO | 0135304 | 5/2002 |
| WO | 2004042536 | 5/2004 |
| WO | 2006113834 | 10/2006 |
| WO | 2009032523 | 5/2009 |
| WO | 2010078522 | 7/2010 |
| WO | 2012068078 | 5/2012 |
| WO | 2012098556 | 7/2012 |
| WO | 2012142370 | 10/2012 |
| WO | 2012167941 | 12/2012 |
| WO | 2013048538 | 4/2013 |
| WO | 2013056104 | 4/2013 |
| WO | 2013119914 | 8/2013 |
| WO | 2013179271 | 12/2013 |
| WO | 2015168334 | 11/2015 |
| WO | 2015179637 | 11/2015 |

OTHER PUBLICATIONS

"Petition for Inter Partes Review of U.S. Pat. No. 8,533,860 Challenging Claims 1-30 Under 35 U.S.C. § 312 and 37 C.F.R. § 42.104", USPTO Patent Trial and Appeal Board, IPR 2016-00600, Feb. 17, 2016, 65 pages.

U.S. Appl. No. 14/600,523, Secure Payment Processing Using Authorization Request, filed Jan. 20, 2015, 42 pages.

U.S. Appl. No. 14/680,874, Non-Final Office Action, dated Aug. 4, 2017, 13 pages.

U.S. Appl. No. 14/680,874, "Notice of Allowability", dated Jun. 14, 2018, 5 pages.

U.S. Appl. No. 14/680,874, Notice of Allowance, dated Mar. 19, 2018, 9 pages.

U.S. Appl. No. 14/719,014, "Restriction Requirement", dated May 26, 2016, 6 pages.

U.S. Appl. No. 14/952,444, Tokenization Request via Access Device, filed Nov. 25, 2015, 78 pages.

(56) References Cited

OTHER PUBLICATIONS

U.S. Appl. No. 14/952,514 , Systems Communications With Non-Sensitive Identifiers, filed Nov. 25, 2015, 72 pages.
U.S. Appl. No. 14/955,716 , Provisioning Platform for Machine-To-Machine Devices, filed Dec. 1, 2015, 61 pages.
U.S. Appl. No. 14/966,948 , Automated Access Data Provisioning, filed Dec. 11, 2015, 52 pages.
U.S. Appl. No. 15/004,705 , Cloud-Based Transactions With Magnetic Secure Transmission, filed Jan. 22, 2016, 161 pages.
U.S. Appl. No. 15/008,388 , Methods for Secure Credential Provisioning, filed Jan. 27, 2016, 90 pages.
U.S. Appl. No. 15/011,366 , Token Check Offline, filed Jan. 29, 2016, 60 pages.
U.S. Appl. No. 15/019,157 , Token Processing Utilizing Multiple Authorizations, filed Feb. 9, 2016, 62 pages.
U.S. Appl. No. 15/041,495 , Peer Forward Authorization of Digital Requests, filed Feb. 11, 2016, 63 pages.
U.S. Appl. No. 15/265,282 , Self-Cleaning Token Valut, filed Sep. 14, 2016, 52 pages.
U.S. Appl. No. 15/462,658 , Replacing Token on a Multi-Token User Device, filed Mar. 17, 2017, 58 pages.
U.S. Appl. No. 61/738,832 , Management of Sensitive Data, filed Dec. 18, 2012, 22 pages.
U.S. Appl. No. 61/751,763 , Payments Bridge, filed Jan. 11, 2013, 64 pages.
U.S. Appl. No. 61/879,632 , Systems and Methods for Managing Mobile Cardholder Verification Methods, filed Sep. 18, 2013, 24 pages.
U.S. Appl. No. 61/892,407 , Issuer Over-The-Air Update Method and System, filed Oct. 17, 2013, 28 pages.
U.S. Appl. No. 61/894,749 , Methods and Systems for Authentication and Issuance of Tokens in a Secure Environment, filed Oct. 23, 2013, 67 pages.
U.S. Appl. No. 61/926,236 , Methods and Systems for Provisioning Mobile Devices With Payment Credentials and Payment Token Identifiers, filed Jan. 10, 2014, 51 pages.
U.S. Appl. No. 62/000,288 , Payment System Canonical Address Format, filed May 19, 2014, 58 pages.
U.S. Appl. No. 62/003,717 , Mobile Merchant Application, filed May 28, 2014, 58 pages.
U.S. Appl. No. 62/024,426 , Secure Transactions Using Mobile Devices, filed Jul. 14, 2014, 102 pages.
U.S. Appl. No. 62/037,033 , Sharing Payment Token, filed Aug. 13, 2014, 36 pages.
U.S. Appl. No. 62/038,174 , Customized Payment Gateway, filed Aug. 15, 2014, 42 pages.
U.S. Appl. No. 62/042,050 , Payment Device Authentication and Authorization System, filed Aug. 26, 2014, 120 pages.
U.S. Appl. No. 62/053,736 , Completing Transactions Without a User Payment Device, filed Sep. 22, 2014, 31 pages.
U.S. Appl. No. 62/054,346 , Mirrored Token Vault, filed Sep. 23, 2014, 38 pages.
U.S. Appl. No. 62/103,522 , Methods and Systems for Wallet Provider Provisioning, filed Jan. 14, 2015, 39 pages.
U.S. Appl. No. 62/108,403 , Wearables With NFC HCE, filed Jan. 27, 2015, 32 pages.
U.S. Appl. No. 62/117,291 , Token and Cryptogram Using Transaction Specific Information, filed Feb. 17, 2015, 25 pages.
U.S. Appl. No. 62/128,709 , Tokenizing Transaction Amounts, filed Mar. 5, 2015, 30 pages.
Fitzgerald , "Report: 3-D Secure not What Name Suggests", American Banker, Feb. 3, 2010, 3 pages.
Application No. PCT/US2015/028365 , International Search Report and Written Opinion, dated Jul. 30, 2015, 14 pages.
Application No. PCT/US2015/031968 , International Search Report and Written Opinion, dated Jul. 27, 2015, 7 pages.

\* cited by examiner

DATA PASSED IN AN INTERACTION

CROSS REFERENCE TO RELATED APPLICATIONS

This application is a continuation of U.S. patent application Ser. No. 14/680,874, filed Apr. 7, 2015, which is a non-provisional application of and claims the benefit of the filing date of U.S. Provisional Application No. 61/976,989, filed on Apr. 8, 2014, which is herein incorporated by reference in its entirety for all purposes.

BACKGROUND

FIG. 1 illustrates a conventional transaction processing system 50. The system 50 comprises a credit card 10 associated with a consumer (not shown). The system 50 further comprises an access device 11, a merchant computer 12, an acquirer computer 13, a payment processing network computer 14, and an issuer computer 15, each of which may be in communication with one another.

The consumer can use the credit card 10 for purchasing a good or service from the merchant. That is, the consumer uses the credit card 10 to provide first data (i.e. payment credentials) for a transaction.

A typical transaction flow involving the system 50 can be described using steps S1-S8. At step S1, the consumer swipes the credit card 10 at the access device 11 to provide payment credentials for a transaction. At step S2, the access device 11 forwards the payment credentials to the merchant computer 12. At step S3, the merchant computer 12 sends an authorization request message including the payment credentials to the acquirer computer 13. At step S4, the acquirer computer 13 forwards the message to the payment processing network computer 14, and at step S5, the payment processing network computer 14 forwards the message to the issuer computer 15. At step S6, the issuer computer 15 authorizes the transaction and sends an authorization response message to the payment processing network computer 14. At step S7, the payment processor computer 14 stores a record of the transaction and forwards the authorization response message to the acquirer computer 13. At step S8, the acquirer computer 13 forwards the message to the merchant computer 12. The merchant then releases the purchased goods and services to the consumer, who then leaves the merchant's store. At a later time, a clearing and settlement process can occur.

Data such as data relating to fraudulent transactions conducted using fraudulent account numbers can be provided to the merchant operating the merchant computer 12. This may be in the form of chargebacks, or fraud reports. However, one problem with this conventional process is that the merchant receives this data after transactions are completed. If the merchant receives this data after the transaction is completed it is of little use. Another problem is the number of communications that may need to occur before the merchant can receive the data. For example, the merchant may need to request the data, and then the payment processing network may then need to provide the data to the merchant. These steps are in addition to the steps needed to perform the payment transaction.

Embodiments of the invention address these and other problems, individually and collectively.

SUMMARY

One embodiment of the invention is directed to a method. The method comprises receiving, by a data processor in a first party mobile device, first data from a first data source, where the first data is beneficial for the first party. The method also comprises obtaining, by the data processor in the first party mobile device, second data from a second data source, where the second data is beneficial to the second party, and then generating, by the data processor in the first party mobile device, a single data element encoding the first data and the second data. Further, the method comprises providing, by the data processor in the first party mobile device, the single data element to a second party device. The second party device then decodes the single data element into the first data and the second data. The second party device is configured to process the first data separately from the second data.

Another embodiment of the invention is directed to a first party device configured to perform the above-described method.

Another embodiment of the invention is directed to a method comprising receiving, by a data processor in a second party device, a single data element from a first party mobile device. The single data element includes first data from a first data source and second data from a second data source, where the first data is beneficial for the first party and the second data is beneficial to the second party. The method also includes decoding, by the data processor in the second party device, the single data element into the first data and the second data, and processing, by the data processor in the second party device, the first data. The method further includes processing, by the data processor in the second party device, the second data separately from the first data.

Another embodiment of the invention is directed to a second party device configured to perform the above-described method.

Further details regarding embodiments of the invention can be found in the Detailed Description and the Figures.

DETAILED DESCRIPTION

Figure 1:
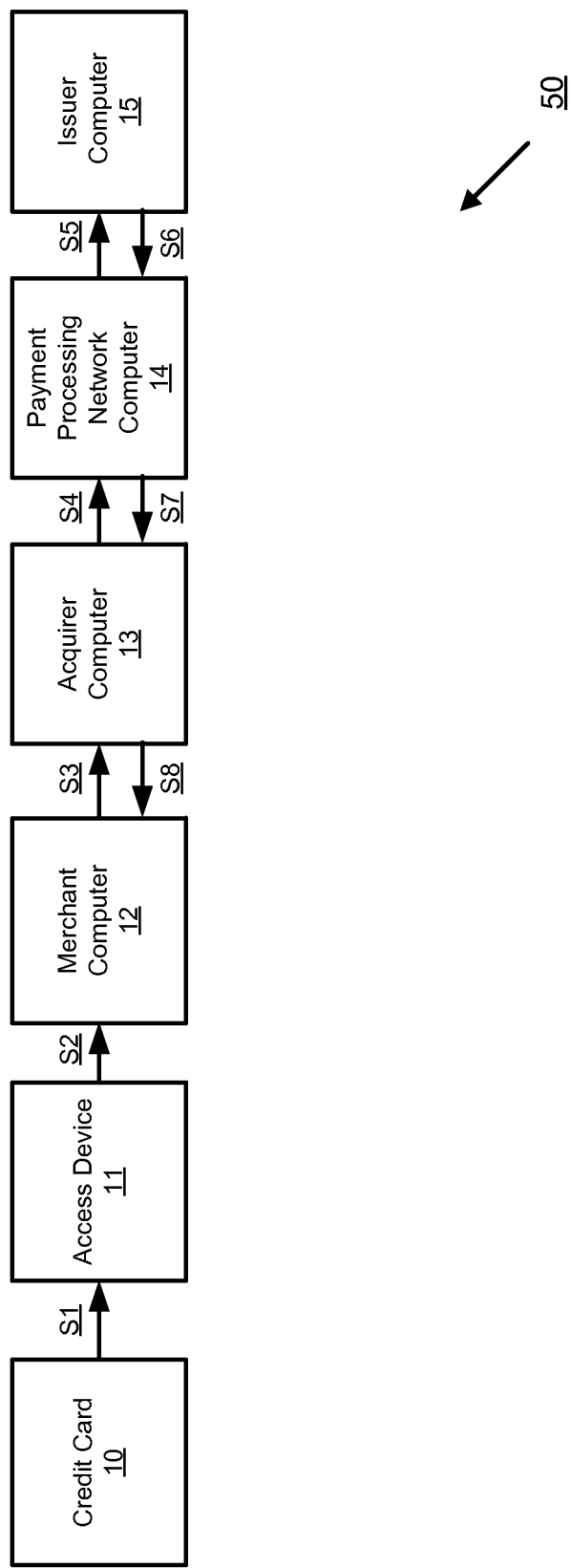
FIG. 1 shows a block diagram of a payment system.

Embodiments of the present invention are directed to providing second data (i.e. merchant-benefitting data) to a merchant at the initiation of a transaction. A consumer's mobile device requests and receives second data from a payment processing network before initiating a transaction. The mobile device also obtains first data (e.g., a payment token) from digital wallet provider. The mobile device creates a QR code containing both the first data and second data, and then initiates a transaction by providing the QR code to a merchant access device. The merchant separates the first data and second data, uses the first data to process the transaction, and benefits from the second data.

In embodiments of the invention, a payment processing network can generate several types of information that can be benefit a merchant. Instead of being limited to the merchant's own perspective, the merchant may be able to share in the payment processing network's more complete perspective of consumer activity. Thus, the merchant can use the data to gain a broader and more accurate understanding of consumer behavioral trends, and the merchant can then make better-informed business and marketing decisions.

The merchant can use the second data for a number of beneficial applications. For example, the second data may be a consumer loyalty score, and the merchant can provide a promotional offer to the consumer based on the loyalty score, thus improving the merchant's marketing practices. Because up-to-date second data is obtained by the mobile device just before the transaction, and because the up-to-date second data is provided to the merchant at the beginning of the transaction, the merchant is able to utilize accurate second data within the transaction timeframe.

Prior to discussing specific embodiments of the invention, some terms may be described in detail.

An "interaction" may include a communication, contact, or exchange between parties, devices, and/or entities. In some embodiments, data can be exchanged in an interaction between two devices (e.g., an interaction between a mobile device and an access device).

A "first party" may be a participant involved with another party. An example of a first party may be a consumer. The consumer may interact with another party, such as a merchant. The first party may operate a first party device such as a mobile phone.

A "second party" may include a participant involved with another party. An example of a second party is a merchant. The merchant may interact with another party, such as a consumer. The second party may operate a second party device such as an access device or a merchant computer.

"First data" may include any suitable information. In some embodiments, first data may be selected primarily based on the interests of the first party. An example of first data is a set of payment credentials provided by a consumer to a merchant for a transaction. Payment credentials are beneficial to a consumer because they allow the consumer to purchase a good or service. Another example of first data is authentication data that confirms the identity of the consumer (e.g., for a transaction or for gaining access to a restricted area). Another example of first data is VAS (Value Added Services) data. VAS data, such as a promotional offer or a loyalty identifier, is beneficial to a consumer because it can enable discounts or other additional services for the consumer.

"Second data" may include any suitable information. In some embodiments, second data may be selected primarily based on the interests of the second party. An example of second data is information that is specifically beneficial for a merchant. Second data may be generated by an entity such as a payment processing network, issuer, acquirer, social network, etc. In some embodiments, it may be provided to a merchant, for the merchant's benefit, via a consumer's mobile device. A payment processing network may have a broader perspective of consumer spending activity than a merchant, as the payment processing network can track consumer spending across multiple merchants, while a single merchant can typically only track consumer spending that takes place at that merchant. Accordingly, a merchant can gain greater perspective of consumer activity when provided with second data, and the merchant can utilize the second data in different ways. For example, the payment processing network can determine a loyalty score for the consumer at the merchant, and the merchant can provide promotional offers to the consumer based on the loyalty score.

Other types of second data that can be beneficial to a merchant include fraud risk information, consumer-habit information, real-time spending trends for a group of consumers, and information about consumer spending at competing merchants. Additionally, second data can include various forms of social media and social network data, such as a consumer's interests and travel plans as indicated on a social networking page. One of ordinary skill in the art would recognize that there are many other types of information that a payment processing network can determine, which a merchant could beneficially use. One of ordinary skill in the art would also recognize that a merchant could utilize different types of second data for various applications, such as marketing strategies, inventory adjustments, and a number of other beneficial activities.

A "first data source" may be an entity that provides first data. An example of a first data source is a digital wallet provider, a payment processing network, an issuer computer, a cloud storage system, a tokenization server or token vault, a mobile phone, etc.

A "second data source" may be an entity that provides second data. An example of a second data source may be a digital wallet provider, a payment processing network, a merchant system a third party system, a manufacturer's system, an issuer computer, etc. Any of these computers and systems may provide second data that can benefit the second party.

A "data element" may include a single packet of data. For example, a data element can include the first data and the second data. An example of a data element is a QR (quick response) code. Other examples of a data element include an NFC message, a programmed magnetic stripe, and any other suitable form of packaged data. A data element is typically transmitted in a single data transmission from a transmitter to a receiver.

A "value credential" may be evidence of worth. Examples of a value credential include payment credentials, promotional offers, etc.

An "affinity score" may be a value or assessment of one party's attraction or level of disengagement to another party. Examples of affinity scores include loyalty scores and attrition scores.

A "loyalty score" may be a value or assessment of one party's affinity to another party. In some embodiments, a higher loyalty score can indicate a higher level of loyalty. A higher level of loyalty can mean that there is a high probability that the first party will continue to interact with the second party in the future. A number of factors can be considered when determining a loyalty score. In one example, a consumer may considered loyal to a certain merchant or merchant category if the consumer regularly visits the merchant with a certain frequency, if the consumer spends a certain amount of money at the merchant, if the consumer spends more at the merchant than at a competitor, or the consumer displays any other suitable loyalty characteristic.

A loyalty score is typically calculated based on historical transaction data. In some embodiments, a merchant can determine a loyalty score for a consumer. In other embodiments, a payment processing network can determine a loyalty score and has access to a larger set of transaction data associated with the consumer, as the data typically includes transactions conducted at multiple different merchants. Accordingly, a loyalty score calculated at a payment processing network may be more accurate and informative, as it can be based on a more global perspective of consumer transactions. A payment processing network may be able to determine a loyalty score that represents a consumer's loyalty to a certain merchant or a certain merchant category.

An "attrition score" may be a value associated with a party's likelihood of disengagement with another party. For example, a high attrition score can indicate that there is a high probability that a consumer will discontinue shopping at a certain merchant. Similar to calculating a loyalty score, an attrition score can be calculated based on a consumer's historical transaction data by identifying behavioral trends and other indicators.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a payment token, a user name, an expiration date, a gift card number or code, and any other suitable information.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "token service system" can include a system that services payment tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may support token processing of payment transactions submitted using tokens by de-tokenizing the token to obtain the actual PAN. In some embodiments, a token service system may include a token service computer alone, or in combination with other computers such as a payment processing network computer.

"Value added services data" (or "VAS data") can include data associated with a value added service. VAS data may be in any suitable form, and may include any suitable type of data. It may include strings of characters, image files, videos, etc. Each piece of value added data may have a tag value associated with it. The tag may be defined by the entity (e.g., a payment processing network) that originates or processes the value added services data. Table 1 below provides examples of value added services data.

TABLE 1

Exemplary value added services data list

| Value added services data | Description | Data Type |
| --- | --- | --- |
| Merchant loyalty ID | Loyalty ID issued by a merchant and processed at a POS terminal | Alphanumeric |
| Alternate loyalty credential—e-mail | Loyalty ID in the form of a consumer e-mail address | E-mail address |
| Alternate loyalty credential—phone | Loyalty ID in the form of a phone number | Numeric |
| Order confirmation | Order number placed by consumer at merchant—for remote order and pickup | Alphanumeric |
| Offer code | Coupon/Offer code locally redeemable by the merchant POS terminal | Numeric |
| Employee ID | Employee ID at retailer which makes them eligible for special discounts | Alphanumeric |
| Zip code | Zip code which may be used for data analysis | Numeric |
| Ticket number | Ticket number which may be processed by a POS terminal | Alpha Numeric |

A "mobile device" may comprise any electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. Further examples of mobile devices include wearable devices, such as smart watches, fitness bands, ankle bracelets, rings, earrings, etc. A mobile device may comprise any suitable hardware and software for performing such functions, and may also include multiple devices or components (e.g. when a device has remote access to a network by tethering to another device—i.e. using the other device as a modem—both devices taken together may be considered a single mobile device). A mobile device may also comprise a verification token in the form of, for instance, a secured hardware or software component within the mobile device and/or one or more external components that may be coupled to the mobile device.

A mobile device may also include any suitable device that may be used to conduct a financial transaction, such as to provide payment information to a merchant. Such a mobile device may be in any suitable form. For example, suitable mobile devices can be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. Other examples of mobile devices include pagers, payment cards, security cards, access cards, smart media, transponders, and the like. If the mobile device is in the form of a debit, credit, or smartcard, the mobile device may also optionally have features such as magnetic stripes. Such devices can operate in either a contact or contactless mode.

"Short range communication" or "short range wireless communication" may comprise any method of providing short-range contact or contactless communications capability, such as RFID, Bluetooth™, infra-red, or other data transfer capability that can be used to exchange data between a mobile device and an access device. In some embodiments, short range communications may be in conformance with a standardized protocol or data transfer mechanism (e.g., ISO 14443/NFC). Short range communication typically comprises communications at a range of less than 2 meters. In some embodiments, it may be preferable to limit the range of short range communications (e.g., to a range of less than 1 meter, less than 10 centimeters, or less than 2.54 centimeters) for security, technical, and/or practical considerations.

An "application" may be computer code or other data stored on a computer readable medium (e.g. memory element or secure element) that may be executable by a processor to complete a task.

A "digital wallet" can include an electronic device that allows an individual to conduct electronic commerce transactions. A digital wallet may store user profile information, payment information, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card.

A "digital wallet provider" may include an entity, such as an issuing bank or third party service provider, that issues a digital wallet to a user that enables the user to conduct financial transactions. A digital wallet provider may provide standalone user-facing software applications that store account numbers, or representations of the account numbers (e.g., payment tokens), on behalf of a cardholder (or other user) to facilitate payments at more than one unrelated merchant, perform person-to-person payments, or load financial value into the digital wallet. A digital wallet provider may enable a user to access its account via a personal computer, mobile device or access device. Additionally, a digital wallet provider may also provide one or more of the following functions: storing multiple payment cards and other payment products on behalf of a user, storing other information including billing address, shipping addresses, and transaction history, initiating a transaction by one or more methods, such as providing a user name and password, NFC or a physical token, and may facilitate pass-through or two-step transactions.

A "consumer" may include an individual or a user that may be associated with one or more personal accounts and/or mobile devices. The consumer may also be referred to as a cardholder, account holder, or user.

An "issuer" may typically refer to a business entity (e.g., a bank) that maintains an account for a user.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers.

An "access device" may be any suitable device that provides access to a remote system. An access device may also be used for communicating with a merchant computer, a payment processing network, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In the examples provided herein, an access device and merchant computer may be referred to as separate system components. It should be appreciated, however, that the access device and merchant computer may be a single component, for example, one merchant mobile device or POS device.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

Figure 2:
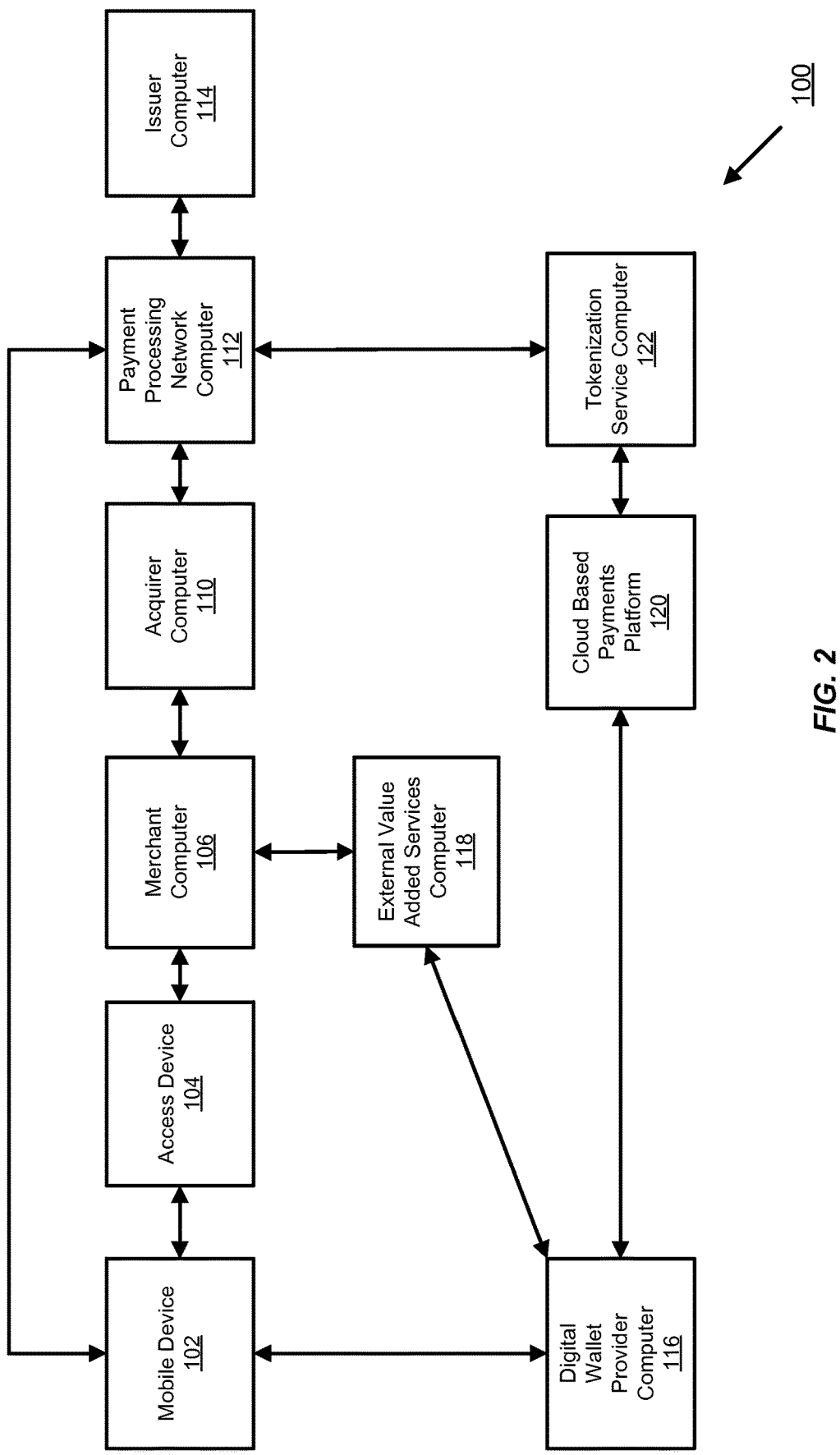
FIG. 2 shows a block diagram of a system according to an embodiment of the invention.

FIG. 2 shows an improved system 100 comprising a number of components. The system 100 comprises a mobile device 102 associated with a consumer (not shown). The system 100 further comprises an access device 104, a merchant computer 106, an acquirer computer 110, a payment processing network computer 112, and an issuer computer 114 which each may be in communication with one another and/or the mobile device 120. The mobile device 102 may also be in communication with a digital wallet provider computer 116, a tokenization service computer 122, and/or any other suitable entity. Furthermore, the digital wallet provider computer 116 may communicate with the tokenization service computer 122, an external value added services computer 118, and a cloud based payments platform 120. The tokenization service computer 122 may also communicate with the payment processing network computer 112.

Each of the entities may communicate through any suitable communication channel or communications network. A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

In the system 50 described above with respect to FIG. 1, only data that is directly beneficial for the consumer (i.e. first data) is provided to the merchant during a transaction. Any second data is provided by the payment processing network at a later time, and is provided too late. In embodiments of the invention, the improved system 100 leverages the existing consumer-merchant communication pathway to benefit the merchant as well, instead of just the consumer. The mobile device 102 can provide not just first data (e.g. payment credentials), but also second data (that is selected based on the interests of the merchant) to the merchant during a transaction.

In embodiments of the invention, the mobile device 102 may be an example of a first party device and can provide a single data element (e.g., a QR code) comprising the first data and second data to the access device 104, which may be an example of a second party device. The second data may be relevant to the current transaction between the consumer and merchant. The mobile device 102 may receive the second data from the payment processing network computer 112 before the transaction is initiated, such that the mobile device 102 can provide the second data to the merchant at the initiation of the transaction. As a result, the merchant computer 106 can have sufficient time for processing the second data within the timeframe of the transaction. For example, there may be enough time to consider the second data (which might be a consumer's fraud risk score) when deciding whether or not to authorize the transaction. Thus, the system 100 allows for providing the merchant computer 106 with second data that is relevant to the current transaction and/or consumer in a timely manner.

In one embodiment, described in detail below, the second data is a loyalty score that represents the consumer's loyalty to the merchant. Since the loyalty score is provided to the merchant computer 106 at the beginning of the transaction, the merchant computer 106 may have sufficient time for selecting a promotional offer based on the loyalty score, and then providing the selected promotional offer to the consumer before the consumer leaves the transaction area. For example, the promotional offer can be provided along with a transaction receipt.

Embodiments of the invention can also be used in systems other than system 100, and for interaction scenarios other than a payment transaction. For example, supplementary data can be obtained and used for security access interactions (i.e., gaining access to a restricted area), for data exchange between two devices (e.g., "tapping" two mobile devices to exchange personal contact information), and for any other suitable interaction.

Figure 3:
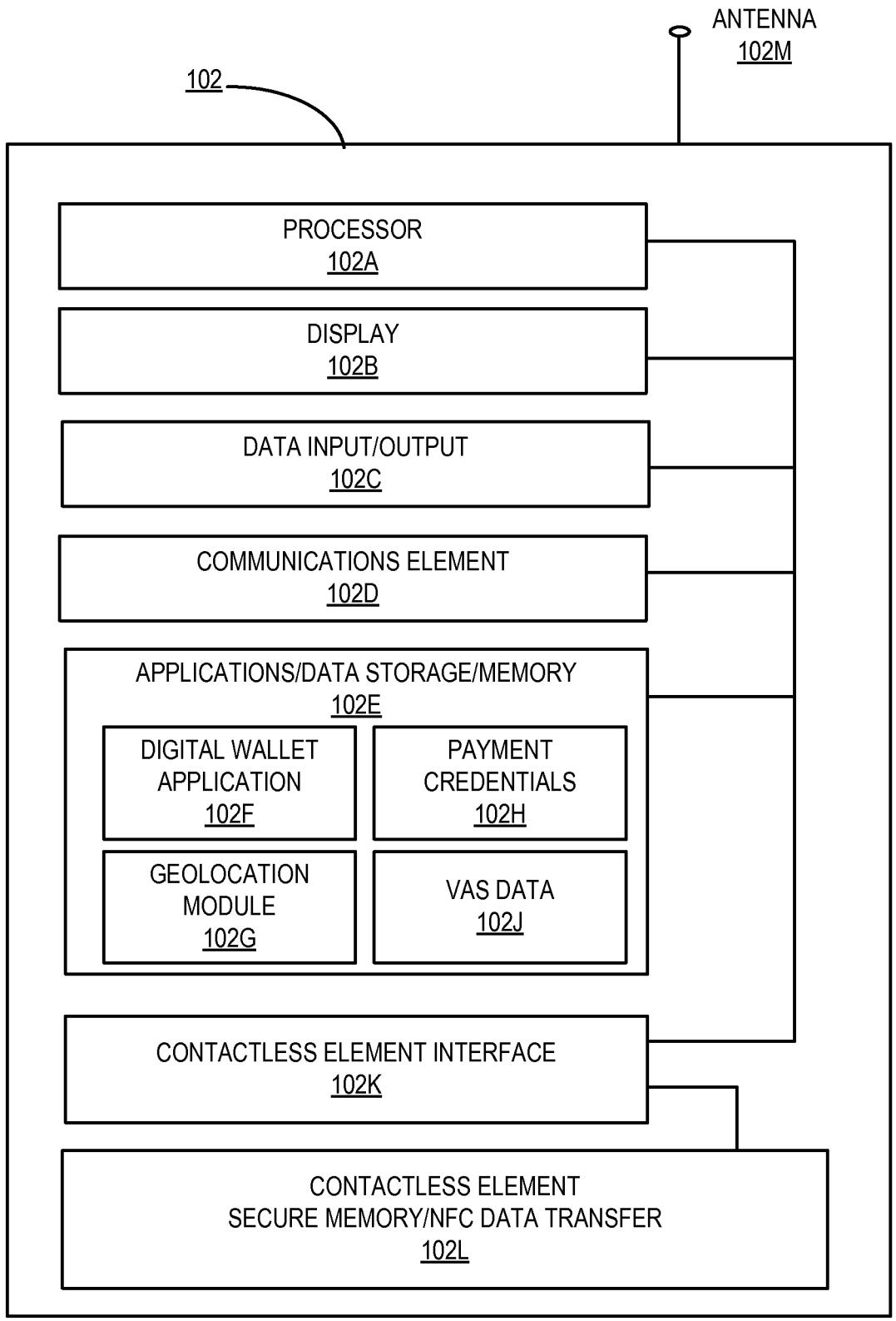
FIG. 3 shows a block diagram of an exemplary mobile device according to an embodiment of the invention.

An example of the mobile device 102 used for providing the first data and second data to the access device 104, according to some embodiments of the invention, is shown in FIG. 3. Mobile device 102 may include circuitry that is used to enable certain device functions, such as telephony. The functional elements responsible for enabling those functions may include a processor 102A that can execute instructions that implement the functions and operations of the device. Processor 102A may access memory 102E (or another suitable data storage region or element) to retrieve instructions or data used in executing the instructions, such as provisioning scripts and mobile applications. Data input/output elements 102C, such as a keyboard or touchscreen, may be used to enable a user to operate the mobile device 102 and input data (e.g., user authentication data). Data input/output elements may also be configured to output data (via a speaker, for example). Display 102B may also be used to output data to a user. Communications element 102D may be used to enable data transfer between mobile device 102 and a wired or wireless network (via antenna 102M, for example) to assist in connectivity to the Internet or other network, and enabling data transfer functions. Mobile device 102 may also include contactless element interface 102K to enable data transfer between contactless element 102L and other elements of the device, where contactless element 102L may include a secure memory and a near field communications data transfer element (or another form of short range communications technology). As noted, a cellular phone or similar device is an example of a mobile device 102 that may be used in accordance with embodiments of the present invention. However, other forms or types of devices may be used without departing from the underlying concepts of the invention. For example, the mobile device 102 may alternatively be in the form of a payment card, a key fob, a tablet computer, a wearable device, etc.

The memory 102E may comprise a digital wallet application 102F, a geolocation module 102G, payment credentials 102H, VAS data 102J, and any other suitable module or data. The mobile device 102 may have any number of mobile applications installed or stored on the memory 102E and is not limited to that shown in FIG. 3. The memory 102E may also comprise code, executable by the processor 102A for implementing a method comprising receiving first data from a first data source, the first data being beneficial for the first party; obtaining second data from a second data source, the second data being beneficial to the second party; generating a single data element encoding the first data and the second data; and providing the single data element to a second party device, the second party device decoding the single data element into the first data and the second data, wherein the second party device is configured to process the first data separately from the second data. In some embodiments, the first and second data sources may be remotely located with respect to the mobile device 102 during a transaction.

The digital wallet application 102F may provide a user interface for the user to provide input and initiate, facilitate, and manage transactions using the mobile device 102. The digital wallet application 102F may be able to store and/or access first data, such as payment credentials 102 and VAS data 102J. Further, the digital wallet application 102F may be able to generate payment tokens and/or obtain payment tokens from the digital wallet provider computer 116 or the tokenization service computer 122.

In some embodiments, the digital wallet application 102F may be able to obtain second data, such as a loyalty score. For example, the digital wallet application 102F may be able to generate and send a loyalty score request to the payment processing network computer 112. The loyalty score request may include consumer identification information, payment credentials 102H, merchant identification information, geolocation data obtained from the geolocation module 102G, and any other suitable information.

In some embodiments, the digital wallet application 102F may be able to generate a single data element including first data and second data. For example, the digital wallet application 102F may generate a QR code including a payment token, VAS data, a digital wallet identifier, a loyalty score, and any other suitable information.

The geolocation module 102G may comprise code that causes the processor 102A to provide geo-location services (e.g., GPS). For example, the geolocation module 102G may contain logic that causes the processor 102A to determine the position of the mobile device 102. The geolocation module 102G may determine a set of coordinates or an address associated with the position of the mobile device 102. In some embodiments, the geolocation module 102G may locate or communicate with one or more satellites in a GPS network. The geolocation module 102G may determine the position of the mobile device 102 based on the relative positions of one or more satellites (e.g. using triangulation). In some embodiments, the geolocation module 102 may determine the position of the mobile device 102 based on communications with other systems, such as a cellular tower network or another network of local positioning beacons.

In some embodiments, the geolocation module 102G may be able to determine if the mobile device 102 is located at or near a merchant location. For example, the geolocation module 102G may store information about one or more merchant locations, such as one or more sets of coordinates or addresses associated with one or more merchant 120 locations. The geolocation module 102G may determine the position of the mobile device 102, and then determine whether the position of the mobile device 102G is at or within a predetermined distance of a merchant location (e.g. within 10, 20, 50, or 100 feet).

Referring back to FIG. 2, the access device 104 may be able to receive first data and second data from the mobile device 102. For example, the access device 104 may be able to read a QR code displayed by the mobile device 102. The merchant computer 106, as described below, may include hardware and software components for decoding and processing the data received by the access device 104. Accordingly, in some embodiments, the access device 104 may pass the received data to the merchant computer 106 for processing. In other embodiments, the access device 104 may include the componentry of the merchant computer 106, and the access device 104 may be able to process the data.

Figure 4:
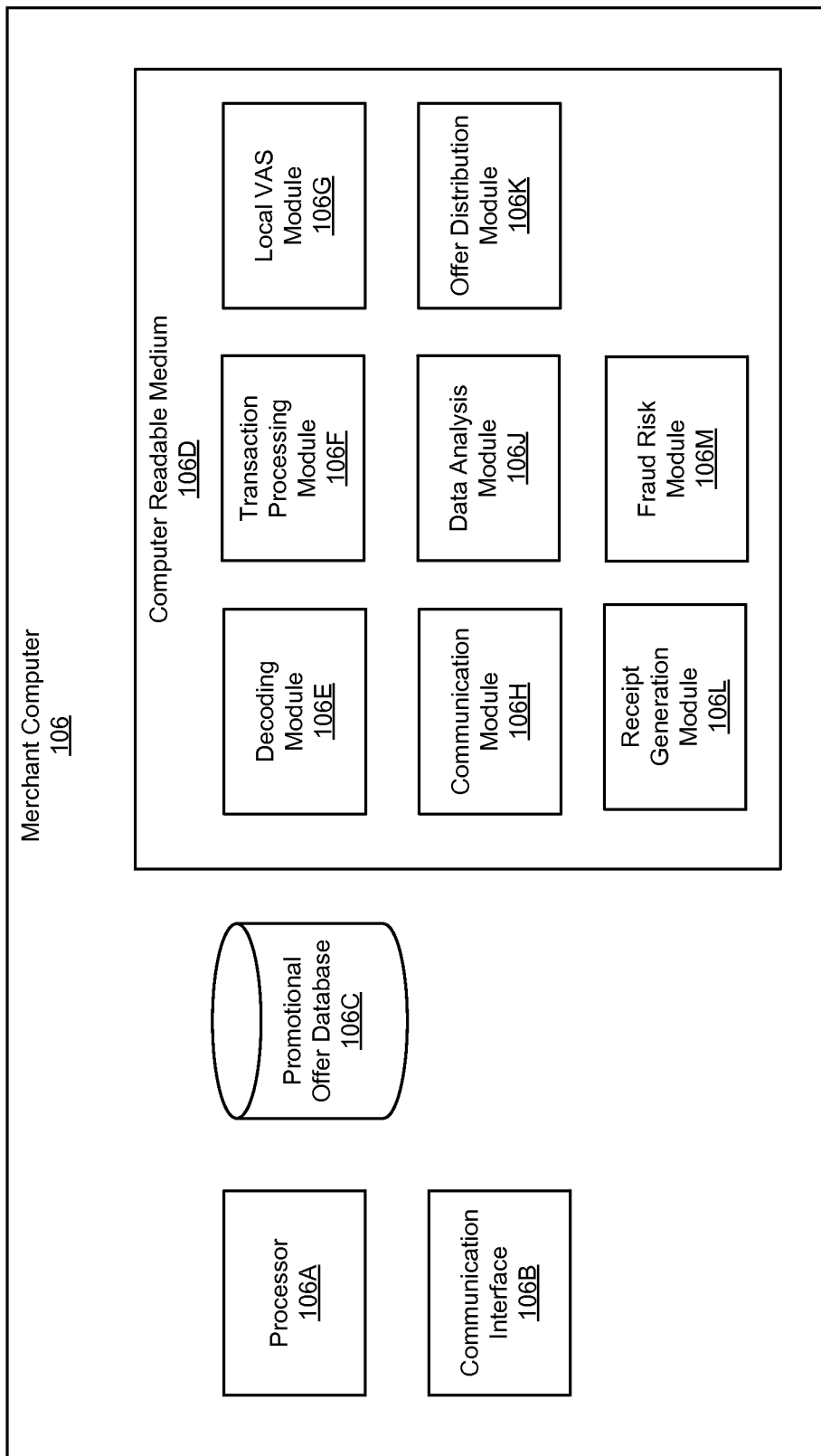
FIG. 4 shows a block diagram of a merchant computer according to an embodiment of the invention.

An example of the merchant computer 106, according to some embodiments of the invention, is shown in FIG. 4. The merchant computer 106 comprises a processor 106A, a communication interface 106B, a promotional offer database 106C, and a computer readable medium 106D.

The computer readable medium 106D may comprise a decoding module 106E, a transaction processing module 106F, a local VAS module 106G, a communication module 106H, a data analysis module 106J, an offer distribution module 106K, a receipt generation module 106L, a fraud risk module 106M, and any other suitable module. It may also comprise code, executable by the processor 106A for implementing a method comprising receiving a single data element from a first party mobile device, wherein the single data element includes first data from a first data and second data from a second data source, the first data being beneficial for the first party and the second data being beneficial to the second party; decoding the single data element into the first data and the second data; and processing the first data; and processing the second data separately from the first data.

The decoding module 106E may comprise code that causes the processor 106A to decode data. For example, the decoding module 106E may contain logic that causes the processor 106A to decode a QR code payload in order to identify and separate first data, such as a payment token and VAS data, from second data, such as a loyalty score.

The transaction processing module 106F may comprise code that causes the processor 106A to process transactions. For example, the transaction processing module 106F may contain logic that causes the processor 106A to generate an authorization request message including some or all of the first data (e.g. a payment token), transaction data, and any other relevant information, and then send the authorization request message to the acquirer computer 110. The transaction processing module 106F may also perform applicable value added services based on information from the local VAS module 106G and the external value added services computer 118.

The local VAS module 106G may comprise code that causes the processor 106A to identify and utilize relevant VAS data during a transaction. For example, the local VAS module 106G may contain logic that causes the processor 106A to redeem rewards points, track rewards points, process coupons, and provide any other value added services based on received VAS data.

The communication module 106H may comprise code that causes the processor 106A to generate messages and otherwise communicate with other entities. For example, the communication module 106H may contain logic that causes the processor 106A to obtain VAS information from the external value added services computer 118.

The data analysis module 106J may comprise code that causes the processor 106A to process second data during a transaction. For example, the data analysis module 106J may contain logic that causes the processor 106A to identify what types of information are included in the second data (e.g., loyalty score, competitor information, current consumer trends, etc.). The data analysis module 106J may also determine one or more actions to be taken based on the second data.

For example, data analysis module 106J may determine that a promotional offer should be provided to one or more consumers (e.g. provide an offer to a loyal consumer, distribute an offer for a good/service that many consumers are purchasing from competitor, etc.). Also, data analysis module 106J may determine that the merchant's inventory should be adjusted (e.g. increase the amount of certain goods that are selling well, decrease the amount of certain goods that consumers usually purchase from a competitor, start selling a second good if consumers typically buy it from another merchant after purchasing a first good here, etc.). A number of other actions that are beneficial to the merchant can be determined and executed based on various types of second data. Examples of additional modules are given below for performing certain actions based on second data. Additional modules could be included for performing other merchant-benefitting actions.

The offer distribution module 106K may comprise code that causes the processor 106A to identify and distribute promotional offers. For example, the offer distribution module 106K may contain logic that causes the processor 106A to determine a promotional offer based on received second data, and then provide the selected promotional offer to the consumer. One type of second data that can be used to select a promotional offer is a loyalty score. In some embodiments, different promotional offers may be provided to consumers with different loyalty scores. For example, a consumer with a high loyalty score may receive a more preferable promotional offer (e.g. a higher discount, or an offer for a preferred good or service).

In some embodiments, the offer distribution module 106K may distribute offers in a different manner, or based on other types of second data. For example, the merchant computer 106 may receive second data indicating that some consumers are choosing to shop at a competitor. In this case, the offer distribution module 106K may select an promotional offer for wide distribution. The promotional offer may be emailed to one or more consumers, shared on a social media website or application, made available to all consumers in a certain region, or otherwise distributed so that consumers are incentivized to shop at the merchant instead of the competitor.

The receipt generation module 106L may comprise code that causes the processor 106A to generate a receipt. For example, the receipt generation module 106L may contain logic that causes the processor 106A to generate an electronic receipt for an authorized transaction. A promotional offer (e.g. an offer selected by the offer distribution module 106K) can be included with a receipt or provided along with a receipt.

The fraud risk module 106M may comprise code that causes the processor 106A to assess the risk of fraud during a transaction. For example, the fraud risk module 106M may contain logic that causes the processor 106A to detect high-velocity transactions, check a "blacklist", and otherwise check fraud/risk levels during a transaction. In some embodiments, the data analysis module 106J may identify that fraud risk information was received as second data. The fraud risk module 106M may determine whether or not to approve/reject the transaction based on the received information.

The promotional offer database 106C may include promotional offers. The merchant computer 106 may distribute promotional offers from the promotional offer database 106C at certain times, to certain consumers, or in any other suitable manner. In some embodiments, promotional offers may be distributed based on second data and/or VAS data, and promotional offers may be distributed by the offer distribution module 106K and/or the local VAS module 106G.

As described above, the merchant computer 106 may process VAS data when processing a transaction. Referring back to FIG. 2, the external value added services computer 118 may be able to communicate VAS data to the merchant computer 106. The external value added services computer 118 may also be able to provide VAS data to the digital wallet provider computer 116 and the mobile device 102. The external value added services computer 118 may be operated by an entity that is different than the other entities shown in FIG. 2.

Still referring to FIG. 2, the acquirer computer 110 may be associated with the merchant computer 106, and may manage authorization requests on behalf of the merchant computer 106. The acquirer computer 110 may receive an authorization request message including payment information from the merchant computer 106 and send the authorization request message to the payment processing network computer 112.

As shown in FIG. 2, the payment processing network computer 112 may be disposed between the acquirer computer 110 and the issuer computer 114. The payment processing network computer 112 may be a part of a payment processing network which may include data processing subsystems, networks, and operations used to support and deliver authorization services, exception file services, and clearing and settlement services. For example, the payment processing network may comprise a server computer (e.g., payment processing network computer 112), coupled to a network interface (e.g. by an external communication interface), and a databases of information. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network computer 112 may use any suitable wired or wireless network, including the Internet.

The payment processing network computer 112, the acquirer computer 110, and the issuer computer 114 may operate suitable routing tables to route authorization request messages using account identifiers such as PANs or tokens. Token routing data may be provided or maintained by the tokenization service computer 122, and may be communicated to any of the entities in FIG. 2.

In addition to routing communications between the acquirer computer 110 and the issuer computer 114, the payment processing network computer 112 may be able to communicate with the mobile device 102. The payment processing network computer 112 may be able to provide various types of information to the mobile device 102, which the mobile device 102 may then include as second data during a transaction with the merchant.

Figure 5:
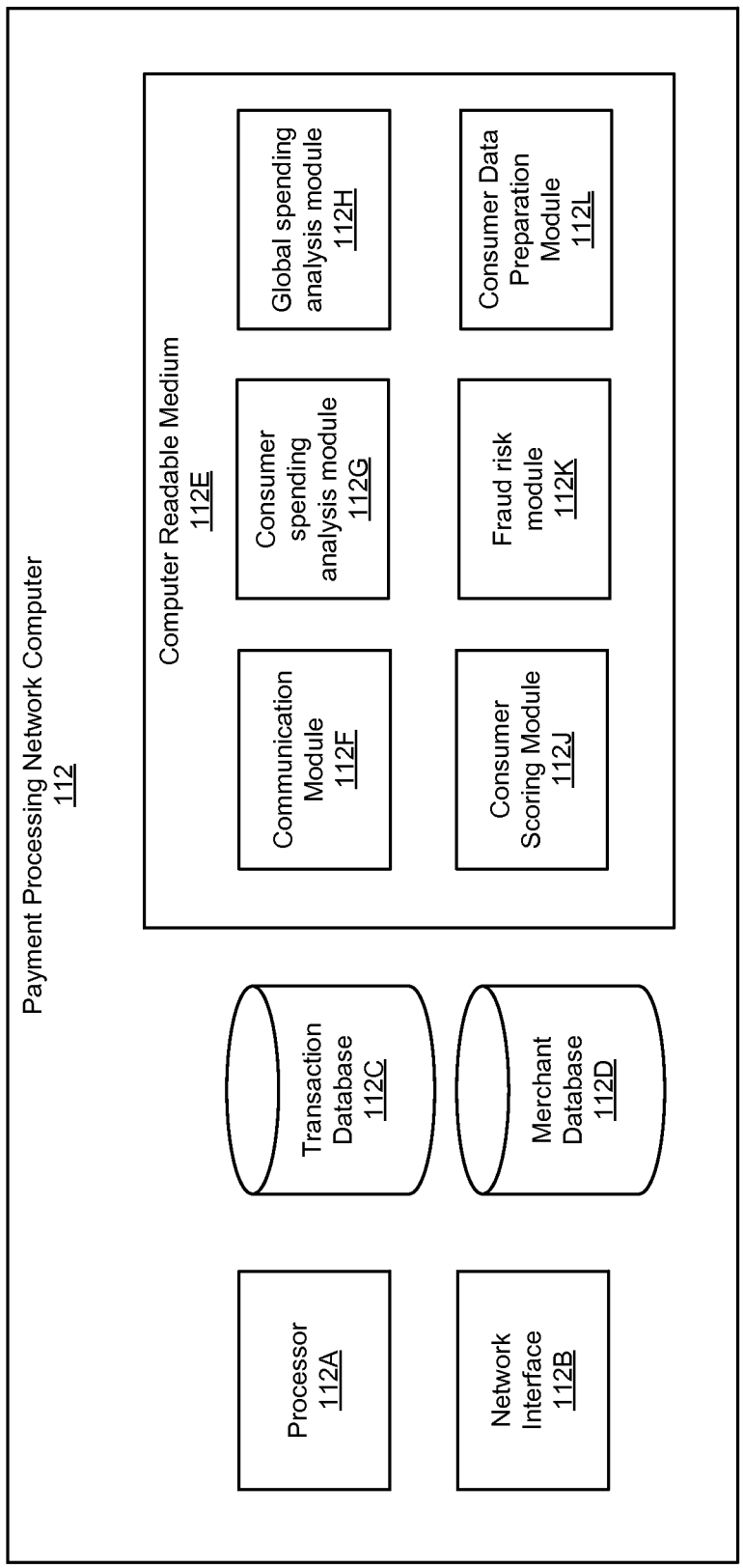
FIG. 5 shows a block diagram of a payment processing network computer according to an embodiment of the invention.

An example of the payment processing network computer 112, according to some embodiments of the invention, is shown in FIG. 5. The payment processing network computer 112 comprises a processor 112A, a network interface 112B, a transaction database 112C, a merchant database 112D, and a computer readable medium 112E.

The computer readable medium 112E may comprise a communication module 112F, a consumer spending analysis module 112G, a global spending analysis module 112H, a consumer scoring module 112J, a fraud risk module 112K, and a consumer data preparation module 112L.

The communication module 112F may comprise code that causes the processor 112A to generate messages, forward messages, reformat messages, and/or otherwise communicate with other entities. For example, the communication module 112F may contain logic that causes the processor 112A to receive an authorization request message from the acquirer computer 110, de-tokenize a payment token by requesting associate payment credentials from the tokenization service computer 122, reformat the authorization request message so that a payment token is replaced with an associated set of payment credentials, and forward the authorization request message to the issuer computer 114.

The communication module 112F may also be able to provide information (e.g. various types of second data) to other entities, such as the mobile device 102. For example, the mobile device 102 may send a request for second data, and the communication module 112F may send a response including one or more types of second data.

The consumer spending analysis module 112G may comprise code that causes the processor 112A to analyze consumer data. For example, the consumer spending analysis module 112G may contain logic that causes the processor 112A to track purchases and trends associated with a consumer. Transaction records stored in the transaction database 112C can be used for consumer analysis. The payment processing network computer 112 may be involved in processing each transaction associated with a consumer's payment account, and thus the payment processing network computer 112 may be able to track the consumer's spending across different merchants. With such a global perspective of transactions, the consumer spending analysis module 112G may be able to determine a consumer's behavioral patterns, and the consumer spending analysis module 112G may be able to predict a consumer's future actions. For example, the consumer spending analysis module 112G may determine which types of products a consumer prefers, which merchants a consumer prefers, in which regions a consumer typically shops, whether a consumer is currently on a road trip or moving, if the consumer travels regularly, how much debt a consumer has, if the consumer has had a recent change in spending, if the consumer spends at certain predictable times, etc. Additionally, the consumer spending analysis module 112G may be able to compare one consumer's behavioral patterns with a general set of consumer behaviors that are based on a group of consumers.

The global spending analysis module 112H may comprise code that causes the processor 112A to analyze groups of consumers. For example, the global spending analysis module 112H may contain logic that causes the processor 112A to analyze trends from within consumers of a certain demographic, region, timeframe, etc. For example, the global spending analysis module 112H may be able to determine if consumers generally prefer a first merchant over a similar second merchant, what types of products consumers are buying more or less of, whether consumers tend to purchase certain products together, if there are currently consumers nearby that are not visiting a certain merchant's store, etc.

The consumer scoring module 112J may comprise code that causes the processor 112A to determine a consumer score. For example, the consumer scoring module 112J may contain logic that causes the processor 112A to determine an affinity score such as a loyalty score or an attrition score for a certain consumer. The payment processing network computer 112 may receive a request for second data, where the request includes consumer identifying information (e.g. payment credentials) and merchant identification information. Using historical spend data associated with the consumer (from the transaction database 112C) and merchant information (from the merchant database 112D), the consumer scoring module 112J may be able to determine a consumer's relationship with the merchant. For example, the consumer scoring module 112J may be able to determine whether the consumer frequently shops at the merchant, whether the consumer prefers the merchant over competitors, whether the consumer is likely to continue shopping at the merchant, whether the consumer is likely to purchase certain products at the merchant, etc. A consumer score, such as an affinity score, can be generated based on this type of analysis.

The fraud risk module 112K may comprise code that causes the processor 112A to assess risk for a certain consumer. For example, the fraud risk module 112K may contain logic that causes the processor 112A to analyze historical transaction data (from the transaction database 112C) associated with the consumer and identify indicators of possible fraud, such as high velocity transactions, declined transactions, disputed transactions, fraud/risk data provided by the issuer, etc. In some embodiments, the fraud risk module 112K may determine fraud/risk data generally associated with the consumer. In other embodiments, the fraud risk module 112K may determine the likelihood of the consumer attempting a fraudulent transaction at a specific merchant.

The consumer data preparation module 112L may comprise code that causes the processor 112A to compile second data for a consumer. For example, the consumer data preparation module 112L may contain logic that causes the processor 112A to gather consumer data from one or more modules (e.g. the consumer scoring module 112J) in response to a request for second data. A request for second data may indicate a certain consumer, a certain merchant, a certain type of second data, etc. In response to receiving a request, the consumer data preparation module 112L may prepare the relevant second data in order to provide the data to the requestor (e.g. the mobile device 102).

The transaction database 112C may include records of previous transactions. Transaction records may indicate the involved consumer, payment credentials, merchant, mobile device, and any other suitable information. The merchant database 112D may include information about merchants. For example, the merchant database 112D may include merchant records with merchant names, merchant location data, merchant preferences for types of second data type, and any other suitable merchant information.

Referring back to FIG. 2, the tokenization service computer 122 may be able to provide tokenization services. The tokenization service computer 122 may be associated with the payment processing network computer 112, the issuer computer 114, the acquirer computer 110, or the merchant computer 106. The tokenization service computer 122 can receive a token request from the digital wallet provider computer 116, the mobile device 102, or any other suitable entity. The request may include information (e.g., a PAN) that identifies a payment account. The tokenization service computer 122 can issue a token that can be used as surrogate payment credentials. A record of the token may be stored at the tokenization service computer 122, and the record may include the token, token expiration date, associated payment credentials, token assurance information, token requestor information, and/or any other suitable information.

The tokenization service computer 122 may also be capable of de-tokenizing a token and providing payment credentials in response to receiving the token. For example, the tokenization service computer 122 may receive requests for payment credentials from the payment processing network computer 112 or the issuer computer 114. The tokenization service computer 122 may receive such a de-tokenization request including a token, identify payment credentials associated with the token, and then provide the payment credentials to the de-tokenization requestor.

As shown in FIG. 2, payment tokens from the tokenization service computer 122 may be distributed via the cloud based payments platform 120. The cloud based payments platform 120 may include a gateway that supplies payment tokens and other information directly to the mobile device 102 or indirectly via the digital wallet provider computer 116.

Figure 6:
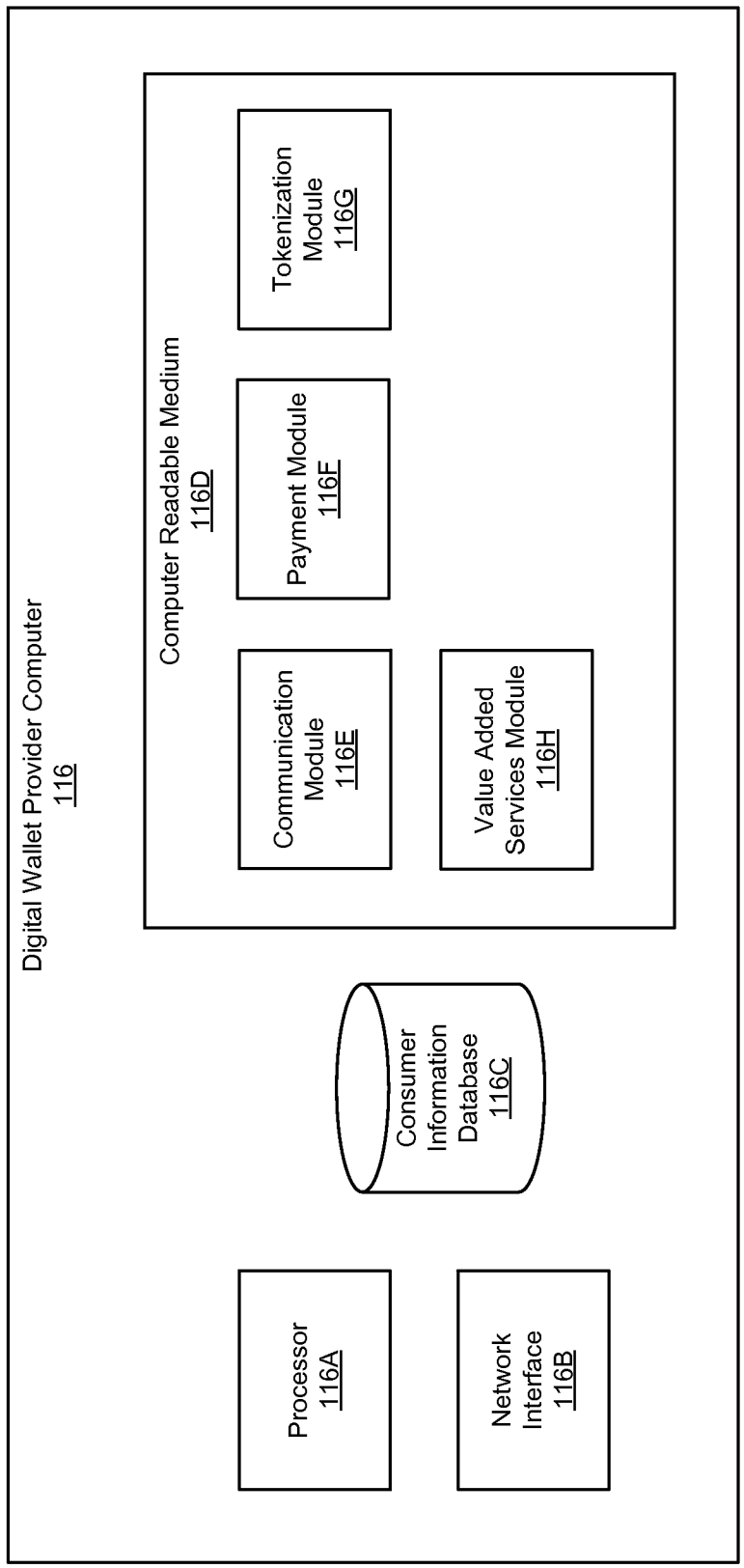
FIG. 6 shows a block diagram of a digital wallet provider computer according to an embodiment of the invention.

As shown in FIG. 2, the digital wallet provider computer 116 may provide payment credentials, payment tokens, VAS data, and any other suitable information to the mobile device 102. An example of a digital wallet provider computer 116, according to some embodiments of the invention, is shown in FIG. 6. The digital wallet provider computer 116 comprises a processor 116A, a network interface 116B, a consumer information database 116C, and a computer readable medium 116D.

The computer readable medium 116D may comprise a communication module 116E, a payment module 116F, a tokenization module 116G, and a value added services module 116H.

The communication module 116E may comprise code that causes the processor 116A to communicate with the mobile device 102, external value added services computer 118, cloud based payments platform 120, and any other suitable entity. For example, the communication module 116E may contain logic that causes the processor 116A to receive a request for a payment token from the mobile device 102, and then send a response including a payment token.

The payment module 116F may comprise code that causes the processor 116A to prepare payment credentials. For example, the payment module 116F may contain logic that causes the processor 116A to compile payment credentials (e.g., from the consumer information database 116C), such as a PAN or payment token, for providing to the mobile device 102. Payment credentials can be provided before each transaction, or payment credentials can be provisioned onto the mobile device 102.

The tokenization module 116G may comprise code that causes the processor 116A to obtain a payment token. For example, the tokenization module 116G may contain logic that causes the processor 116A to request a payment token from the cloud based payment platform 120 for a certain payment account on behalf of the consumer. In some embodiments, the tokenization module 116G may be able to generate payment tokens.

The value added services module 116H may comprise code that causes the processor 116A to prepare VAS data. For example, the value added services module 116H may contain logic that causes the processor 116A to compile VAS data associated with the consumer for a transaction. VAS data can be obtained from the consumer information database 116C, from the external value added services computer 118, and from any other suitable location. VAS data can be selected based on the merchant with which the consumer is transacting.

The consumer information database 116C may contain consumer information. For example, the consumer information database 116C may include payment credentials, VAS data, information about obtaining payment tokens, and any other suitable information associated with a consumer.

Figure 7:
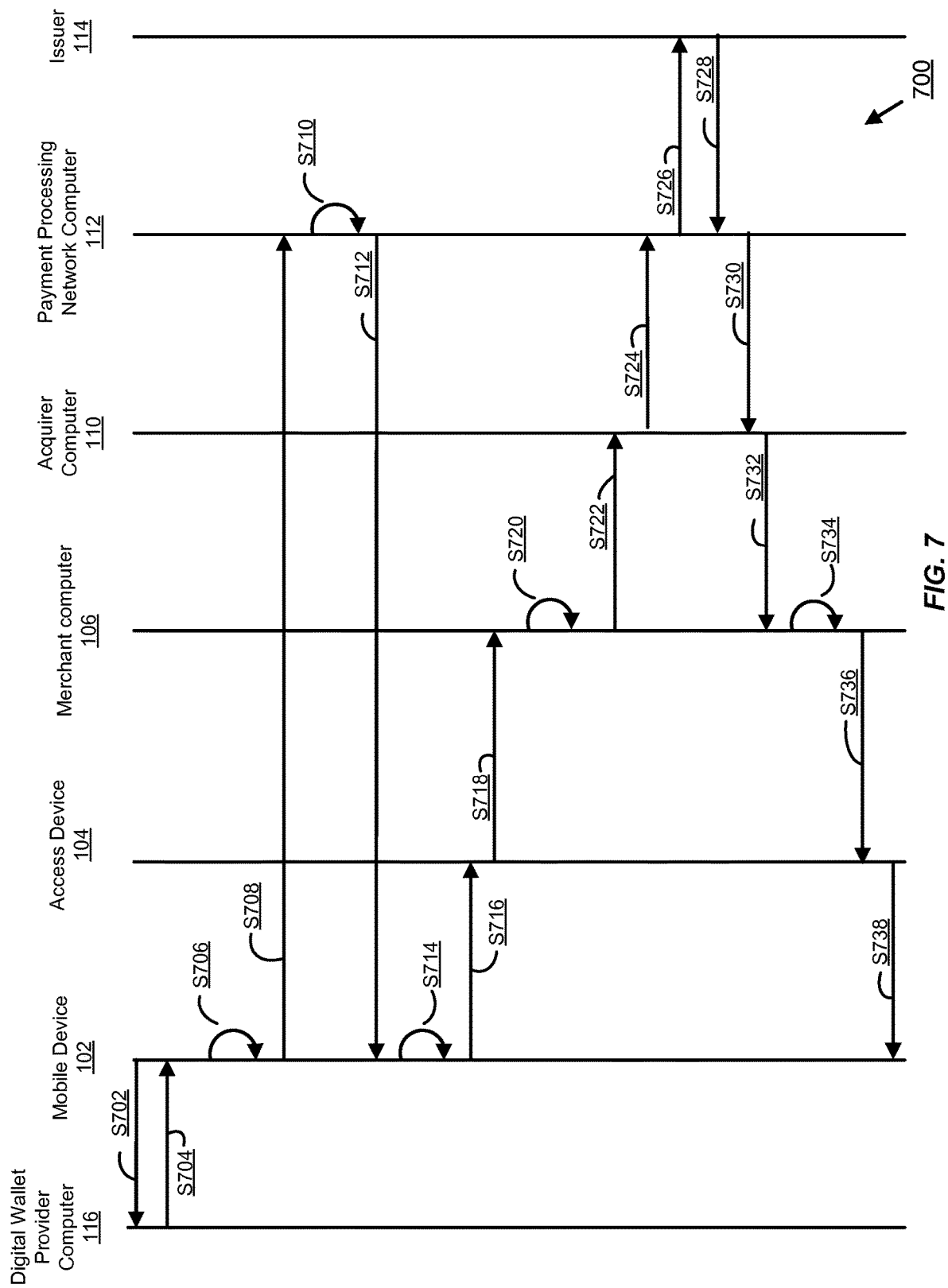
FIG. 7 shows a flow diagram illustrating a method according to embodiments of the invention.

A method 700 according to embodiments of the invention can be described with respect to FIG. 7. Some elements in other Figures are also referred to. The steps shown in the method 700 may be performed sequentially or in any suitable order in embodiments of the invention.

The various messages in FIG. 7 may use any suitable form of communication. In some embodiments, a request or response may be in an electronic message format, such as an e-mail, a short messaging service (SMS) message, a multimedia messaging service (MMS) message, a hypertext transfer protocol (HTTP) request message, a transmission control protocol (TCP) packet, a web form submission. The request or response may be directed to any suitable location, such as an e-mail address, a telephone number, an internet protocol (IP) address, or a uniform resource locator (URL). In some embodiments, a request or response may comprise a mix of different message types, such as both email and SMS messages.

In embodiments of the invention, a consumer's mobile device can provide a centrally-determined loyalty score to a merchant during a transaction. The mobile device receives a loyalty score generated by a payment processing network, combines payment credentials and the loyalty score into a single data element, and transmits the data element to a merchant access device. The merchant may use the loyalty score to provide targeted, tiered offers to the consumer within the timeframe of the transaction.

As described above, besides a loyalty score, several other types of merchant-benefitting second data can be provided, and the merchant can take a number of actions based on the data. The specific example of providing a loyalty score, and the merchant responding with a promotional offer, is described here for illustration purposes.

In order to initiate the method 700, the consumer may activate the mobile wallet application 102F on the mobile device 102, and may indicate a desire to make a payment (e.g., by selecting a "payment" option). The consumer may wish to purchase a good or service at the merchant via the mobile device 102. Further, the consumer may select a payment account within the mobile wallet application 102F (e.g., by selecting a visually displayed icon representing a payment account).

At step S702, the digital wallet application 102F may send a token request message to the digital wallet provider computer 116. The token request message can include payment credentials and any other suitable information. The digital wallet provider computer 116 can obtain a payment token that represents the payment credentials from the tokenization service computer 122.

At step S704, the digital wallet application 102F may receive a token response message including the payment token from the digital wallet provider computer 116. In addition to the payment token, the digital wallet provider computer 116 may transmit other information including one or more of a token expiration date, a token requestor ID, a digital wallet ID, and any other suitable information. The digital wallet provider computer 116 may also provide VAS data from the consumer information database 116C and/or the external value added services computer 118.

At step S706, the geolocation module 102G may determine the location of the mobile device 102 and provide the location data to the mobile wallet application 102F.

At step S708, the mobile wallet application 102F may send a second data request message to the payment processing network computer 112. The second data request message may include a mobile device identifier, a consumer identifier, location data, a merchant identifier, payment credentials, and any other suitable information.

At step S710, the payment processing network computer 112 may determine one or more types of second data for providing to the mobile device 102. Using one or more of the modules 112G-112L, the payment processing network computer 112 may determine suitable second data based on the consumer and the merchant. For example, the consumer scoring module 112J may determine a loyalty score associated with the consumer at the merchant. The consumer may be identified based on the mobile device 102 identifier or the payment credentials, and the merchant may be identified based a record in the merchant database 112D that is associated with the geolocation data. In some embodiments, the consumer data preparation module 112L may include any second data that is considered to be beneficial for the merchant. Although this example illustrates the payment processing network computer 112 as providing the second data, it is understood that any other computer (e.g., the issuer computer 114) may provide the second data. For example, the payment processing network 112 may generate a fraud or risk score based upon the payment credentials received in step S708.

At step S712, the mobile wallet application 102F may receive a second data response message including the loyalty score from the payment processing network computer 112.

At step S714, the mobile wallet application 102F may generate a transaction payload including the first data (e.g., the payment token and VAS data), the second data (e.g., the loyalty score), and any other suitable information. The transaction payload may be consolidated into a single data element, such as a QR code. In other embodiments, the single data element that is generated may be a single data packet that can be transmitted through a contact interface, a contactless medium (e.g., WiFi, NFC, etc.), etc.

At step S716, the mobile wallet application 102F may provide the transaction payload to the access device 104. For example, a QR code may be displayed (e.g., via display 102B), the consumer may hold the mobile device 102 within interaction range of the access device 104, and the access device may read the QR code. Any other suitable communication mechanism (e.g., a contactless mechanism) may be used to pass the transaction payload to the access device 104.

At step S718, the access device 104 may send the received information to the merchant computer 106.

At step S720, the merchant computer 106 may then convert the single data element into the original data that was used to form the single data element. For example, the merchant computer 106 may decode the QR code (e.g. via the decoding module 106E), thereby obtaining the payment token, the loyalty score, the VAS data, and any other data included in the QR code. It is noted that the access device 104 could perform the functions of the merchant computer 106 in other embodiments of the invention.

Once the merchant computer 106 has isolated the first data (e.g., payment credentials and VAS data) and the second data (e.g., loyalty score), the transaction can be processed (e.g. via the transaction processing module 106F). The merchant computer may first process the received VAS data, as well as retrieve any additional VAS data from the local VAS module 106G and/or the external value added services computer 118. For example, if there are any applicable coupons, the merchant computer 106 may reduce the amount of the transaction by the value of the coupon. In another example, if the second data is a fraud score for the consumer, then the merchant may take appropriate action based upon that fraud score. For example, if the fraud score is high, then the merchant may decide not to proceed with the transaction and/or may ask the consumer for additional authentication information or assurance of payment (e.g., an alternative source of funds).

At step S722, the merchant computer 106 may generate an authorization request message for the transaction, and send the authorization request message to the acquirer computer 110. The authorization request message may include the payment token, transaction information, and any other suitable information.

At step S724, the acquirer computer 110 may forward the authorization request message to the payment processing network computer 112.

The payment processing network computer 112 may de-tokenize the payment token in the authorization request message by obtaining the associated payment credentials from the tokenization service computer 122. At step S726, the payment processing network computer 112 may reformat the authorization request message to include the payment credentials (e.g., a real PAN or primary account number, a real CVV or card verification value, etc.), and then forward the authorization request message to the issuer computer 114.

At step S728, the issuer computer 114 then determines whether or not the transaction should be authorized. The issuer computer 114 may check the status of the payment account, conduct any appropriate fraud or credit checks, and perform any other suitable processing in order to determine whether or not to approve of the transaction. After this analysis occurs, the issuer computer 114 then generates and sends an authorization response message back to the payment processing network computer 112.

At step S730, the payment processing network computer 112 may reformat the authorization response message to include the payment token and remove the payment credentials, and then forward the authorization response message to the acquirer computer 110. The payment processing network computer 112 may also store a record of the transaction at the transaction database 112C.

At step S732, the acquirer computer 110 may forward the authorization response message to the merchant computer 106.

At step S734, the merchant computer 106 may process the second data. For example, the merchant computer 106 may determine that a loyalty score is included in the second data (e.g., via the data analysis module 106J). The merchant computer 106 may also analyze the loyalty score in order to determine one or more possible actions that may be beneficial for the merchant.

In some embodiments, the merchant computer 106 may determine that it would be beneficial to provide a promotional offer to the consumer. The merchant computer 106 may select a promotional offer based on the loyalty score (e.g., via the offer distribution module 106K). For example, a promotional offer that is preferred to the consumer may be selected if the loyalty score indicates higher than average loyalty to the merchant. The selected promotional offer may be sent to the communication module 106H, such that it may be provided to the consumer. In some embodiments, the promotional offer can be provided to the mobile device 102 in an electronic receipt.

As described above, there are several other types of second data that are beneficial to the merchant, and which may be provided in step S712. Further, the merchant computer 106 may be able to perform a number of alternative actions based on various types of second data.

In some embodiments, the merchant computer 106 may process the second data (e.g. loyalty score) in step S734 after receiving the authorization response message. However, the second data may alternatively be processed before or at the same time as processing the first data. Further, as noted above, in step S720, the second data may have been processed by the merchant computer 106 prior to sending an authorization request message to the issuer computer 114.

At step S736, the merchant computer 106 may forward the authorization response message to the access device 104. The merchant computer 106 may also generate and send an electronic receipt to the access device 104. In some embodiments, the promotional offer may be included in the electronic receipt.

At step S738, the access device 104 may inform the consumer that the transaction is approved, and the goods or services may be released to the consumer. Also, the electronic receipt and promotional offer may be transmitted to the mobile device 102 (e.g. via QR code, NFC, etc.). The promotional offer may beneficially persuade the consumer to return to the merchant at a later date for a future purchase, thus increasing commerce at the merchant.

Accordingly, the second data, which may not be necessary for conducting a transaction, can be provided during a transaction for the benefit of the merchant. The mobile device 102 obtains the loyalty score before the transaction begins, and thus the mobile device 102 can provide the loyalty score along with the payment token at the onset of the transaction. Since the merchant computer 106 receives the loyalty score right away, there may be sufficient time to identify the appropriate promotional offer while the transaction is being processed. As a result, the promotional offer can be provided to the mobile device 102 in an electronic receipt, such that the promotional offer is provided to the consumer before the consumer leaves the area.

At the end of the day or at some other predetermined interval of time, a clearing and settlement process between the issuer computer 114, the payment processing network computer 112, and the acquirer computer 110 may occur. In the clearing and settlement process, account information and token exchanges that are similar to those in the above-described authorization processing steps can occur.

Embodiments of the invention have a number of advantages. A merchant can have a more accurate understanding of a consumer's spending behaviors, as well as a more accurate picture of overall consumer/market activities. For example, a merchant can learn about how it is performing in relation to a competitor, and how consumer spending within the merchant category is changing. Essentially, a merchant can gain the perspective of a payment processing network. This can allow a merchant to make well-informed business and marketing decisions, leading to a competitive edge and better economic results.

Further, the mobile device to access device communication pathway, which is traditionally reserved for obtaining data beneficial to the consumer, is leveraged for providing a merchant with information that may benefit the merchant. As a result, the merchant can receive supplementary data (related to the consumer and/or market) in time to take action while the consumer is present and before a transaction is initiated. Also, by transmitting data beneficial to a merchant through a communication path normally used to transmit data beneficial to a consumer, a number of steps are reduced. For example, if the merchant wants to obtain a fraud or loyalty score from a payment processing network, then the merchant needs to separately communicate with the merchant and request that data. However, in embodiments of the invention, these extra steps and communications are advantageously not required.

Figure 8:
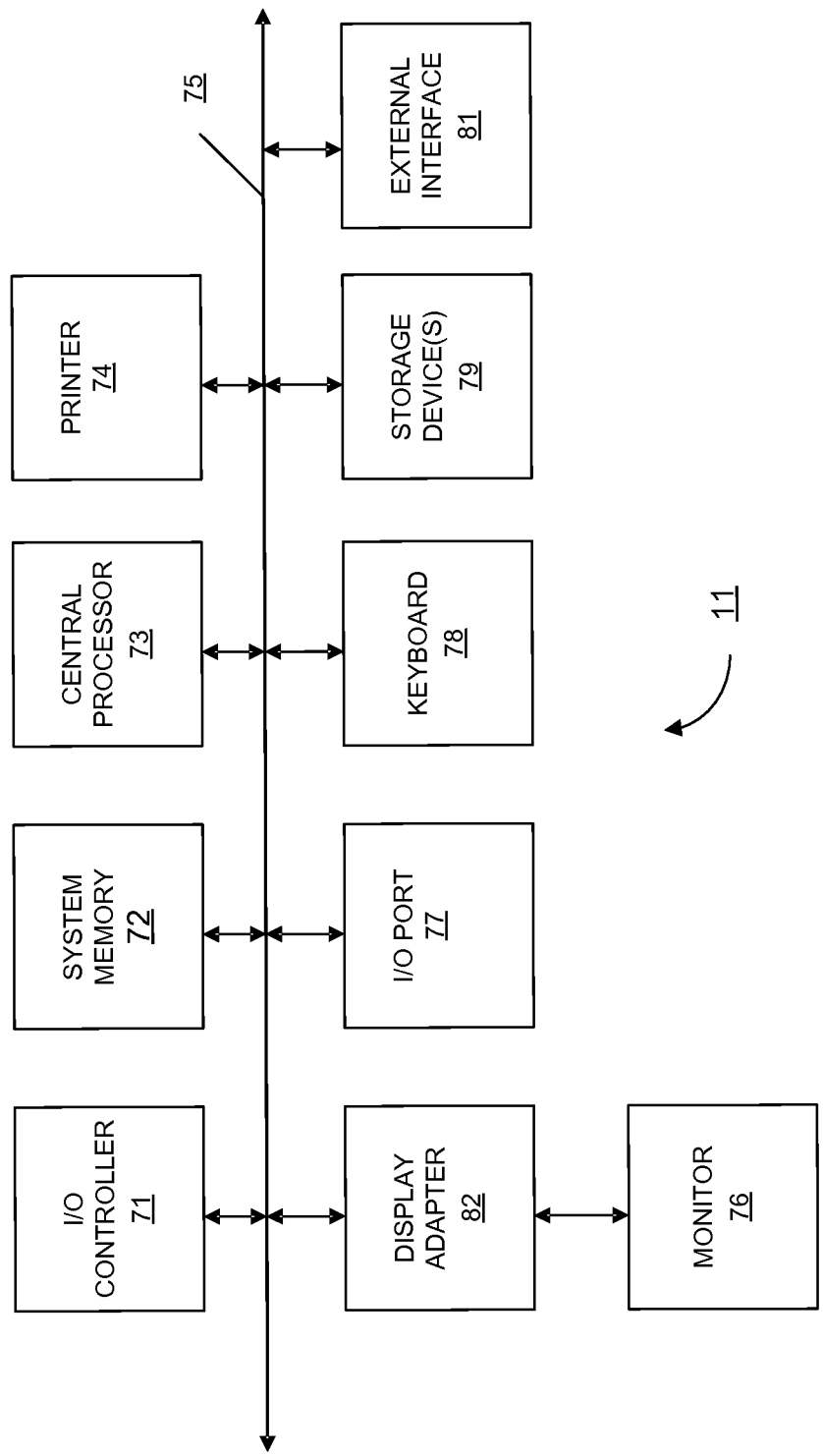
FIG. 8 shows a block diagram of a computer apparatus according to an embodiment of the invention.

FIG. 8 is a high-level block diagram 11 of a computer system that may be used to implement any of the entities or components described above. The subsystems shown in FIG. 8 are interconnected via a system bus 75. Additional subsystems include a printer 74, keyboard 78, storage device 79, and monitor 76, which is coupled to display adapter 82. Peripherals and input/output (I/O) devices, which couple to I/O controller 71, can be connected to the computer system by any number of means known in the art, such as a serial port. For example, I/O port 77 or external interface 81 can be used to connect the computer apparatus to a wide area network such as the Internet, a mouse input device, or a scanner. The interconnection via system bus 75 allows the central processor 73 to communicate with each subsystem and to control the execution of instructions from system memory 72 or the storage device 79, as well as the exchange of information between subsystems. The system memory 72 and/or the storage device may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method of facilitating an interaction between a consumer and a merchant, the method comprising:
   receiving, by a system, from a consumer mobile device, a first request for first data;
   generating, by the system, the first data, wherein the first data comprises a payment credential associated with the consumer;
   transmitting, by the system, the first data to the consumer mobile device;
   receiving, by the system, from the consumer mobile device, a second request for second data, the second request including a location of the consumer mobile device;
   determining an identity of the merchant based on the location;
   determining, by the system, the second data, wherein the second data includes an affinity score of the consumer to interact with the merchant based on previous interactions between the consumer and multiple merchants; and
   transmitting, by the system, the second data to the consumer mobile device, wherein the consumer mobile device generates a single data element encoding the first data and the second data, the consumer mobile device provides the single data element to a merchant device, the merchant device decodes the single data element into the first data and the second data, the merchant device processes the first data separately from the second data, the merchant device uses the first data to process a payment transaction, the merchant device selects an incentive based on the second data, and the merchant device transmits the incentive to the consumer mobile device.

2. The method of claim 1, wherein the consumer mobile device determines the location of the consumer mobile device.

3. The method of claim 2, wherein determining the location of the consumer mobile device includes determining GPS coordinates or an address.

4. The method of claim 1, wherein the system is a token service system that includes a tokenization service computer and a payment processing network computer.

5. The method of claim 4, wherein the first request is received and the first data is generated by a first data source, the first data source being the tokenization service computer and the payment credential being a payment token, and wherein the second request is received and the second data determined by a second data source, the second data source being the payment processing network computer.

6. The method of claim 1, wherein the second data further includes a likelihood that the consumer is authentic.

7. The method of claim 1, wherein the single data element is a QR code.

8. The method of claim 1, wherein the system has a global view of previous interactions involving the consumer.

9. The method of claim 1, further comprising:
   receiving, by the system, from the merchant device, a request to process the interaction between the consumer mobile device and the merchant device, the request including the first data; and
   processing, by the system, the interaction using the first data.

10. The method of claim 1, wherein the affinity score is a loyalty score or an attrition score of the consumer to the merchant.

11. The method of claim 1, wherein the merchant is associated with a merchant category, and wherein the affinity score is a loyalty score of the consumer to the merchant category.

12. The method of claim 1, wherein the merchant is associated with a merchant category, and wherein determining the affinity score includes determining a first interaction rate of the consumer with the merchant and comparing it to a second interaction rate of the consumer with other competing merchants within the same merchant category.

13. A system comprising:
    a token service computer comprising a first processor and a first non-transitory computer readable medium, the first non-transitory computer readable medium comprising first code, executable by the first processor to implement a first method comprising:
       receiving, from a consumer mobile device associated with a consumer, a first request for first data;
       generating the first data, wherein the first data comprises a payment credential associated with the consumer; and
       transmitting the first data to the consumer mobile device; and
    a payment processing network computer in communication with the token service computer, the payment processing network computer comprising a second processor and a second non-transitory computer readable medium, the second non-transitory computer readable medium comprising second code, executable by the second processor for implementing a second method comprising:
       receiving, from the consumer mobile device, a second request for second data, the second request including a location of the consumer mobile device;
       determining an identity of a merchant based on the location;
       determining the second data, wherein the second data includes an affinity score of the consumer to interact with the merchant based on previous interactions between the consumer and multiple merchants; and
       transmitting the second data to the consumer mobile device, wherein the consumer mobile device generates generating a single data element encoding the first data and the second data, the consumer mobile device provides the single data element to a merchant device, the merchant device decodes decoding the single data element into the first data and the second data, the merchant device processes the first data separately from the second data, the merchant device uses the first data to process a payment transaction, the merchant device selects an incentive based on the second data, and the merchant device transmits the incentive to the consumer mobile device.

14. The system of claim 13, wherein the consumer mobile device determines the location of the consumer mobile device.

15. The system of claim 14, wherein determining the location of the consumer mobile device includes determining GPS coordinates or an address.

16. The system of claim 13, wherein the payment credential is a payment token.

17. The system of claim 13, wherein the second data further includes a likelihood that the consumer mobile device is authentic.

18. The system of claim 13, wherein the single data element is a QR code.

19. The system of claim 13, wherein the merchant device selects and provides the incentive to promote subsequent interactions.

20. The system of claim 13, wherein the method implemented when the second processor executes the second code further comprises:
receiving, from the merchant device, a request to process an interaction between the consumer mobile device and the merchant device, the request including the first data; and
processing the interaction using the first data.

* * * * *